United States Patent Office 3,582,282
Patented June 1, 1971

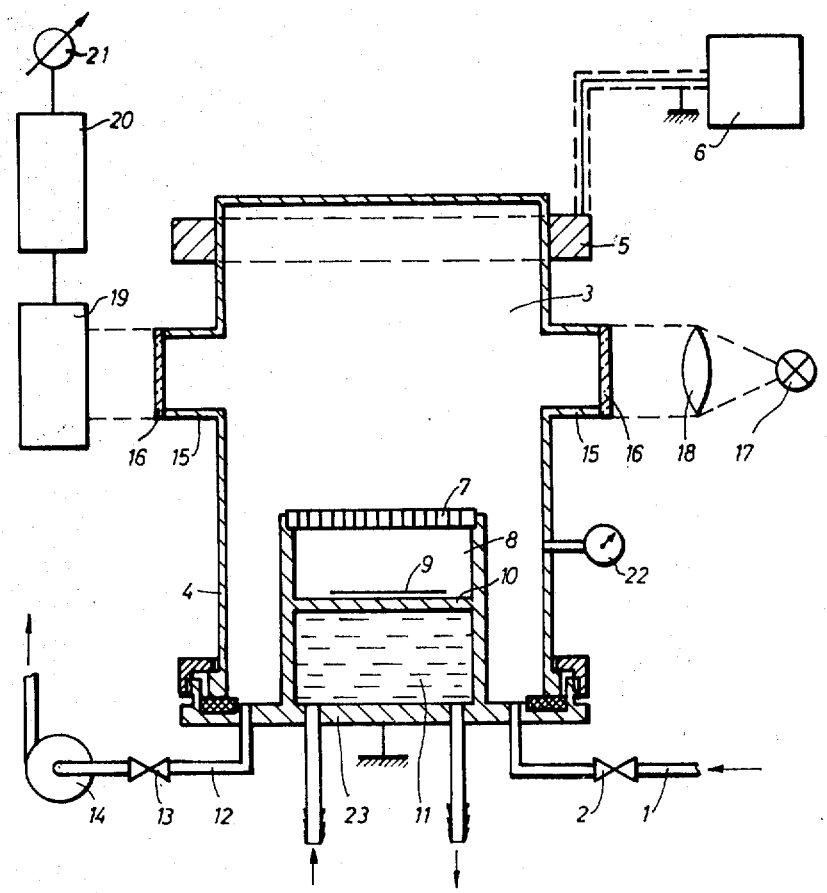

3,582,282
PROCESS AND AN APPARATUS FOR THE ACCELERATED WEATHERING OF PIGMENTED VEHICLE SYSTEMS
Günther Kämpf and Hans-Georg Völz, Krefeld-Bockum, and Hans-Georg Fitzky, Odenthal-Hahnenberg, Germany, assignors to Farbenfabriken Bayer Aktiengesellschaft, Leverkusen, Germany
Filed Aug. 6, 1968, Ser. No. 750,736
Claims priority, application Germany, Aug. 7, 1967, F 53,167
Int. Cl. G01m *17/00*
U.S. Cl. 23—230          16 Claims

ABSTRACT OF THE DISCLOSURE

Pigmented paint films which chalk upon aging, are subjected to accelerated aging, employing as the accelerating means radicals which may be produced in a gas to which the film is exposed.

BACKGROUND

This invention relates to a process and an apparatus for the accelerated weathering of pigmented vehicle systems, intended in particular for investigating the chalking of paint films.

Accelerated-weathering and colour-stability tests have long been used in practice to examine pigmented vehicle systems for their stability to the influences of weather and light, because a considerable period of time is always required for tests under natural light and weather conditions, so-called free weathering. The expression "weathering" covers all the influences that are exerted by weather in its various forms. The requirements which the reliability of accelerated weathering has to satisfy are always more stringent than those made of free weathering. Thus, in recent years, numerous tests have been conducted on accelerated weathering apparatus of all kinds in order to shorten the long periods of waiting involved in free weathering.

The apparatus originally used for accelerated weathering were designed in such a way that the pigmented lacquer films to be tested were applied to supports, exposed to a high-energy light source and then periodically moistened with water for predetermined periods. The spectral energy distribution of the light sources used is adapted as closely as possible to that of sunlight. Carbon-arc lamps and high-pressure xenon lamps are preferably used, occasionally with certain filters provided between the lamp and the samples. The samples are usually rotated during testing in order to guarantee uniform exposure.

The lack of stability of paint films provided with white pigments to the influences of weather is expressed in the behaviour known as "chalking." Due to the distintegration of the upper vehicle layers, the pigments distributed in the paint film are exposed at the surface where they can be rinsed or wiped away.

In weathering tests, Kempf's chalking test according to DIN 53159 is used as a measure of the destruction of the lacquer film. In this test, a piece of black photographic paper with its gelatin layer swollen by water is placed on the paint to be tested and then stamped with a rubber stamp under a load of 25 kp. The exposed pigment particles adhere to the layer of gelatin and the impression can be visually assessed. An assessment is then made to determine whether, and to what extent, the chalking of the paint to be tested differs from that of the control paint.

The apparatus originally used still had the disadvantage of excessively long testing times varying between 50 and 500 hours, depending upon the type of vehicle system, the pigment and the design of the apparatus.

THE INVENTION

It has now been found that the testing times can be shortened very considerably if, in accordance with the invention, the vehicle system to be tested is degraded under the influence of radicals supplied from outside and/or produced in the vehicle system. In this way, degradation can be accelerated to such an extent that, in some cases, retarding measures are even required in order to obtain sufficiently long measuring times.

For the purposes of the invention, the radicals are produced by conventional processes such as, for example, by the action of high-energy electromagnetic wave radiation of the highly accelerated particles upon the corresponding gases or vapours, on water in particular. Hydroxyl radicals which have proved to be the most suitable can be produced in particular either by the combustion of water in an oxygen-containing atmosphere or by the decomposition of $H_2O_2$. The radicals are produced with particular advantage by high-frequency discharge. In order to obtain satisfactorily reproducible results, the pressure of the gas (which can be a vapour) present is preferably kept constant. Similarly, it is of advantage to keep the concentration of the radicals produced per unit time at a substantially constant level. The sample, too, is preferably kept at a constant temperature. According to the invention, the concentration of the radicals is determined by known methods. Spectroscopic measurement at the emission or absorption band characteristic of the particular radical has proved to be of particular advantage for this purpose. The band lying between 306 and 325 mm. for example is characteristic of the OH radical. The concentration of the OH radicals can be determined by known methods of calculation from the intensity of the band. It is also possible for this purpose to make a mass-spectroscopic measurement at the ratio of mass to charge which is characteristic of the particular radical. Another possibility is to measure the electron-spin resonance at the resonance site charatceristic of the particular radical.

When pigmented vehicle systems (i.e. pigmented paint films) are degraded by radicals in the manner according to the invention, the lacquer or vehicle system and/or pigment pass through radical states, just as in combustion, which may also be used for detection. In the particular case of vehicle systems pigmented with titanium dioxide, $Ti^{3+}$ centres occur as intermediate stages whose concentration may be measured by various methods and in particular through their electron-spin resonance.

The apparatus according to the invention for carrying out the process consists of a chamber accommodating the sample comprising a removable, sealing closure, a gas inlet and a gas outlet and an electrode connected to a high-frequency source. A thermostatically controlled sample or specimen holder is with advantage arranged in the chamber. In order to retard the process of weathering, the chamber is provided with a sample compartment which is separated off from the rest of the interior of the chamber by a diffusion barrier. This diffusion barrier consists for example of a replaceable porous glass frit which only allows a limited number of radicals through, thus promoting the premature recombination of several radicals. The chamber is with advantage provided with at least one window in front of which there is positioned a conventional instrument for measuring the concentration of the radicals. As a rule, however, the chamber is provided with two windows facing one another because most of the conventional instruments use rays which have to pass through the contents of the chamber. By regulating the output of the high frequency source consisting for example of a high-frequency generator, it is possible to keep the concentration of the radicals at a constant level, so that the intensity of the characteristic band in spectroscopic measurement, the ratio of mass to charge in mass spectroscopic measurement and the resonance site where the electron spin resonance is measured, may alternatively be used as the control quantity. In addition, pressure gauges and control instruments are provided on the chamber or on the gas pipes.

The radicals may also be determined by means of conventional methods of analytical chemical detection, for example, by reacting oxidising and reducing agents with the highly reactive radicals. Thus the OH radicals occurring may be detected by the known reaction.

$$NO_2^- + 2 \cdot OH \rightarrow NO_3^- + H_2O$$

In exposed weathering and in conventional accelerated weathering apparatus, the stability to chalking of various paint systems may be determined on the basis of the various periods of time, characteristic of the particular system, which elapse until a certain level of chalking has been reached. It has been found in confirmation that, both with the apparatus according to the invention and with the process according to the invention, the periods of time needed, again characteristic of the particular paint systems, although different in length, are considerably shorter than those required in conventional accelerated weathering apparatus to obtain a certain level of chalking, and the results obtained are closer to those obtained in free weathering than those obtained with conventional accelerated weathering apparatus.

The periods of time required to obtain a certain level of chalking both in the apparatus according to the invention, with or without diffusion barriers, and in conventional accelerated weathering apparatus of the kind widely used in practice are compared in the following table for an alkyd-based paint film pigmented with after-treated rutile, and for a paint of similar composition pigmented with untreated anatase (pigment volume concentration in each case approximately 10%).

| | Time lapsing up to a certain chalking level | | |
|---|---|---|---|
| | Apparatus according to the invention | | Conventional accelerated weathering apparatus, hours |
| | Without diffusion barrier, mins. | With diffusion barrier, hours | |
| Alkyd-based paint film pigmented with: | | | |
| After-treated rutile | 45 | 6 | 480 |
| Untreated anatase | 30 | 4 | 50 |

This shows that the process on which the invention is based and the apparatus according to the invention by which it is carried out represent a simple, extremely quick and selective means of testing pigmented vehicle systems as regards to their resistance both to weathering and to light.

One embodiment of the apparatus according to the invention is now described by way of example with reference to the accompanying drawing.

The gases or vapors, preferably degassed steam, flowing through a gas feed pipe 1 are delivered into the interior 3 of a chamber 4 through a regulator 2, preferably a needle valve. Radicals are produced from the gas or vapour introduced by means of the electrode 5 which is fed from the high-frequency source 6 in the form of a high-frequency generator. Some of the radicals flow through a diffusion barrier 7 consisting preferably of a glass frit with a certain degree of porosity, into a sample compartment 8 containing a sample 9 consisting, for example, of a paint film applied to a substrate. The sample 9 rests on a sample holder 10 provided with a thermostat 11. A gas outlet 12 with an adjustable valve 13 leads to a vacuum pump 14. The ends of the cylindrical pipes 15 are closed, for example, by windows 16 consisting of quartz plates. In order to measure the concentration of the radicals, for example, the light of a light source 17 radiating continuously in the ultra-violet region is directed into the discharge zone through a quartz condenser lens 18. The absorption lines of the light issuing are measured in a radiation receiver 20 having passed through a monochromator 19, and are recorded on an indicator 21. In cases where emission is measured, the emitted light issuing from the windows is fed directly to the monochromator 19, measured in the radiation receiver 20 and recorded in the indicator 21. The reference 22 denotes a pressure gauge. The chamber 4 can be closed by the removable, sealing closure 23.

We claim:
1. In a process of testing resistance of pigmented paint films to weathering reactions producing chalking wherein a specimen of film is exposed to conditions which accelerate the weathering reactions and an effect of said exposure is correlated with free weathering, the improvement which comprises:
   (a) the step of producing radicals in a gas, and
   (b) the step of accelerating the weathering reactions by exposing the specimen to the radicals.
2. A process as claimed in claim 1, wherein said radicals are OH radicals.
3. A process as claimed in claim 1, wherein the radicals are produced by high-frequency discharge.
4. A process as claimed in claim 1, wherein the pressure of the gas is kept constant.
5. A process as claimed in claim 1, wherein the specimen is kept at a constant temperature.
6. A process as claimed in claim 1, wherein the resistance to weathering is determined by measuring radical centres occurring as intermediate stages in the film.
7. A process as claimed in claim 1, wherein the number of radicals produced per unit time is constant.
8. A process as claimed in claim 7, wherein the concentration of the radicals is determined by detection.
9. A process as claimed in claim 8, wherein, to detect the radicals, a spectroscopic measurement is made at the emission or absorption band characteristic of the particular radical.
10. A process as claimed in claim 8, wherein, to detect the radicals, a mass-spectroscopic measurement is made at the ratio of mass to charge characteristic of the particular radical.
11. A process as claimed in claim 8, wherein, to detect the radicals, the electron-spin resonance is measured at the resonance site characteristic of the particular radical.
12. A process as claimed in claim 8, wherein the radicals are detected by quantitative determination by analytical chemical detection.
13. Apparatus for testing resistance of pigmented paint films to weathering reactions producing chalking, comprising:
   (a) a chamber for holding a gas in the chamber, and having a gas inlet and a gas outlet, and a removable closure,
   (b) a specimen holder within said chamber for holding a film specimen to be tested, with the film exposed to the gas in the chamber,
   (c) means for controlling the temperature of the film specimen,
   (d) means for producing radicals in the gas, and
   (e) detecting means for measuring the concentration of the radicals in the chamber.

14. Apparatus according to claim 13, and means for maintaining a vacuum in said chamber.

15. Apparatus according to claim 13, said means for producing radicals in the gas comprising a high frequency source and an electrode operatively connected therewith and mounted on the chamber to cause formation of the radicals.

16. Apparatus according to claim 15, and a diffusion barrier in the chamber interposed between the electrode and the film specimen to limit access of the radicals to the film specimen.

References Cited

Kuenster, H. G. et al.: Journal of Paint Technology, vol. 40, pp. 48A–54A (No. 516), January 1968.

MORRIS O. WOLK, Primary Examiner

E. A. KATZ, Assistant Examiner

U.S. Cl. X.R.

23—253; 73—150